(12) United States Patent
Qiu et al.

(10) Patent No.: US 11,431,587 B2
(45) Date of Patent: Aug. 30, 2022

(54) SYSTEMS AND METHODS TO DEPLOY CLOUD-NATIVE MICROSERVICES FOR COMMUNICATION SERVICES ON SCALE

(71) Applicant: AT & T Intellectual Property I, L.P., Atlanta, GA (US)

(72) Inventors: Chaoxin Qiu, Austin, TX (US); Mark A. Ratcliffe, Oakhurst, NJ (US); Min Lu, Holmdel, NJ (US); Eric Ashby, Batavia, IL (US); Arshad Khan, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/015,463

(22) Filed: Sep. 9, 2020

(65) Prior Publication Data

US 2022/0078091 A1    Mar. 10, 2022

(51) Int. Cl.
*H04L 41/5054*    (2022.01)
*H04L 41/5025*    (2022.01)

(52) U.S. Cl.
CPC ...... *H04L 41/5054* (2013.01); *H04L 41/5025* (2013.01)

(58) Field of Classification Search
CPC .................. H04L 41/5025; H04L 41/5054
See application file for complete search history.

(56) References Cited

U.S. PATENT DOCUMENTS

| | | | |
|---|---|---|---|
| 8,260,840 B1 * | 9/2012 | Sirota | G06F 9/5061 725/94 |
| 9,594,649 B2 | 3/2017 | Yang et al. | |
| 9,674,639 B2 | 6/2017 | Qiu et al. | |
| 9,946,614 B2 | 4/2018 | Yang et al. | |
| 10,212,035 B2 | 2/2019 | Qiu et al. | |
| 11,038,745 B1 * | 6/2021 | Vasquez | H04L 45/24 |
| 2019/0014056 A1 * | 1/2019 | Sharma | H04L 47/762 |
| 2020/0169857 A1 * | 5/2020 | Yang | H04L 43/0858 |

* cited by examiner

*Primary Examiner* — John A Follansbee
*Assistant Examiner* — Fadi Haj Said
(74) *Attorney, Agent, or Firm* — Guntin & Gust, PLC; John G. Rauch

(57) ABSTRACT

A method for bundling network functions as a single microservice in a cloud environment. A service deployment manager may acquire subscriber location information associated with a subscriber or a subscriber profile associated with the subscriber. Moreover, the service deployment manager may utilize the subscriber location information or the subscriber profile to select a cloud location. For example, the cloud location may be based on load, geographical proximity, service profile, etc.

20 Claims, 12 Drawing Sheets

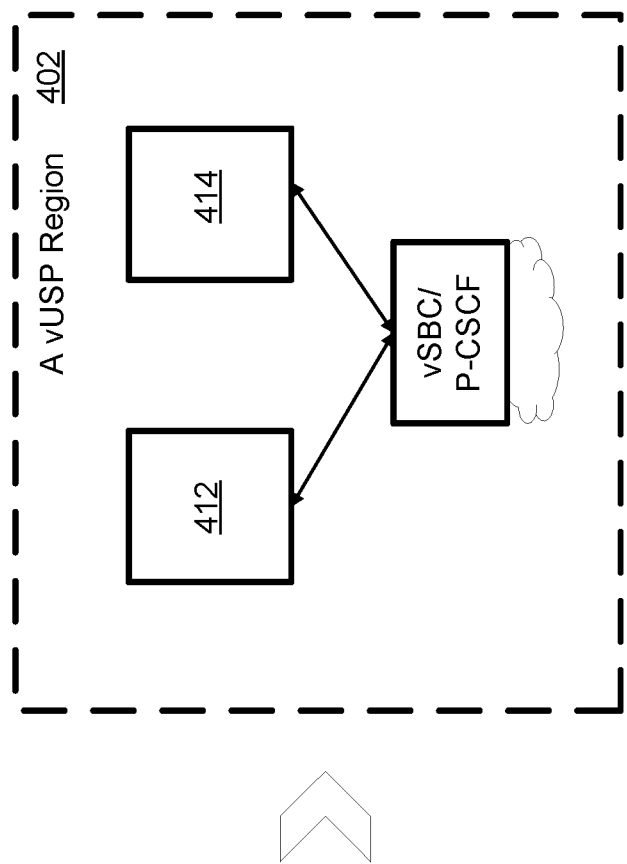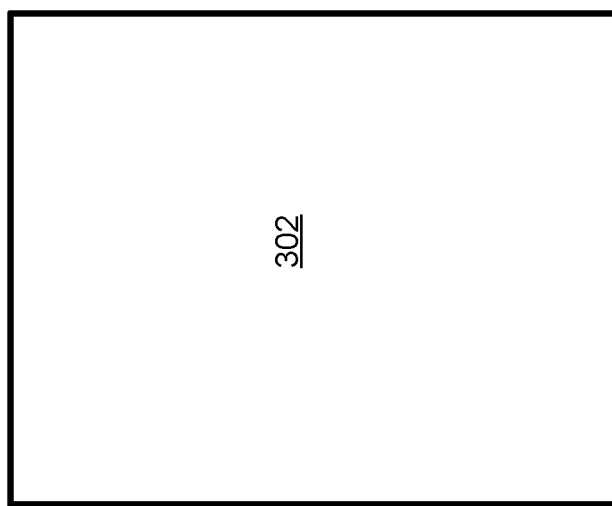
FIG. 4B

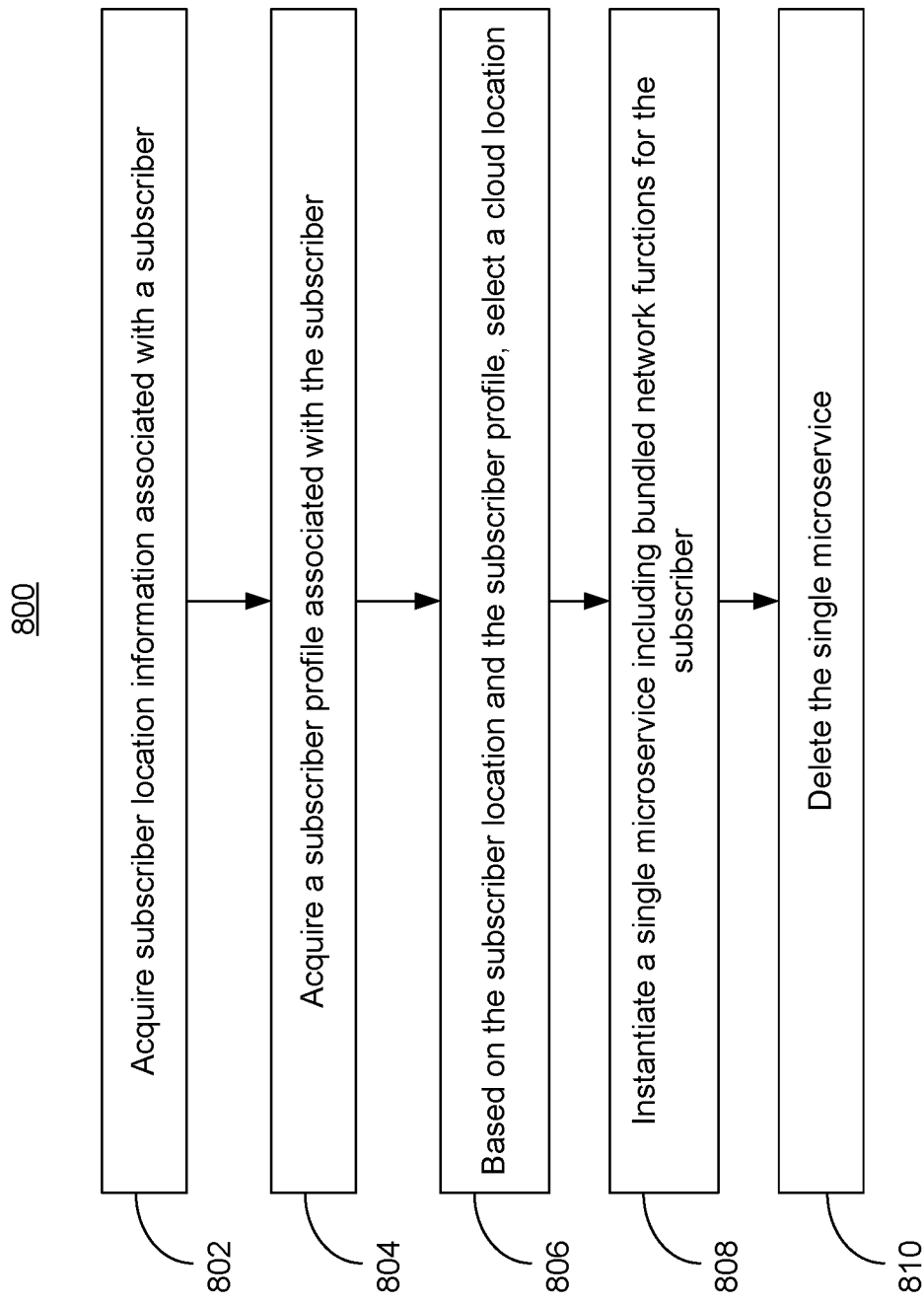

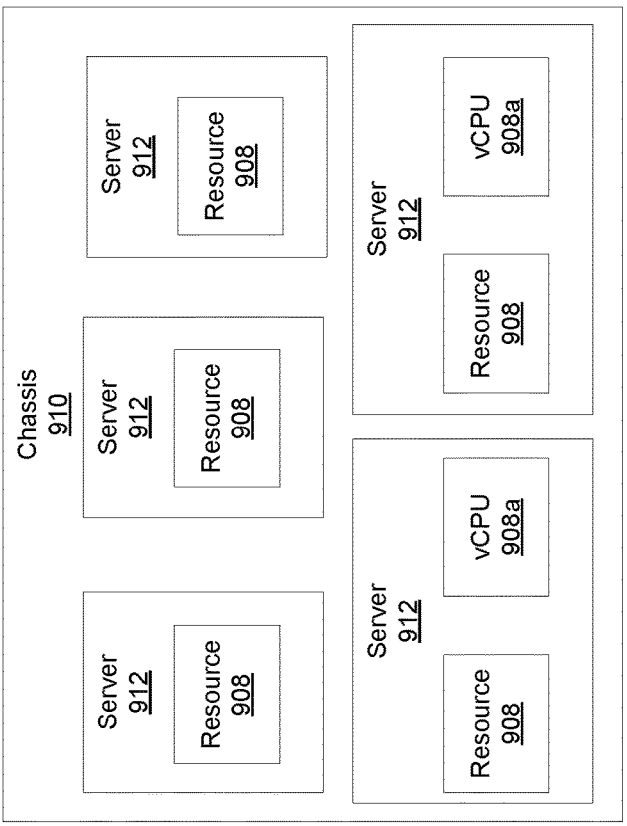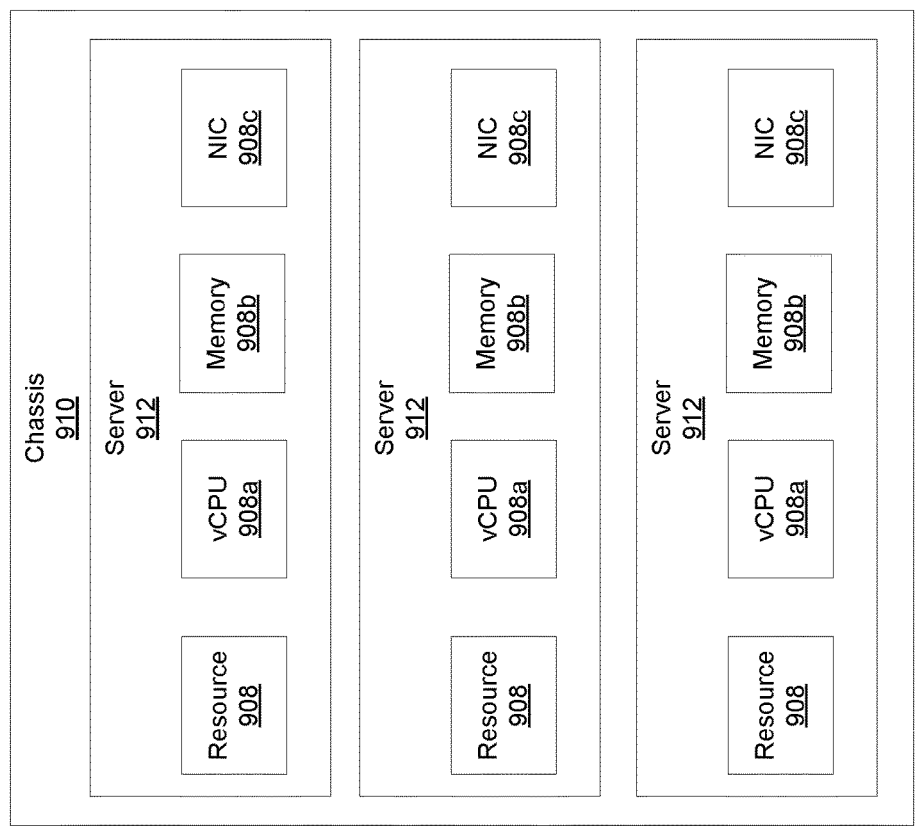
FIG. 9B

SYSTEMS AND METHODS TO DEPLOY CLOUD-NATIVE MICROSERVICES FOR COMMUNICATION SERVICES ON SCALE

BACKGROUND

Many network functions are needed to provide an end-to-end real-time communication service. For example, in a fourth generation Voice over Long-Term Evolution (4G VoLTE) broadband cellular network, an end-to-end communication session may require network functions, including Serving Gateway (S-GW), Packet Data Network Gateway (PDN-GW), Mobility Management Entity (MME), Session Border Controller (SBC) (and Proxy-Call Session Control Function (P-CSCF)), Interrogating Call Session Control Function (I-CSCF), Serving Call Session Control Function (S-CSCF), Service Consistency and Continuity Application Server (SCC-AS), Breakout Gateway Control Function (BGCF), Media Gateway Controller Function (MGCF), Home Subscriber Server (HSS), various application servers such as Client-To-Server (CTS)/Telephony Application Server (TAS), Internet Protocol (IP) Messaging Servers, and Presence Servers, etc. When the industry virtualizes these network functions and deploys them on cloud infrastructure, each individual network function is virtualized and deployed.

Communication services are supported essentially in the traditional fashion: network functions are deployed first; communication services are supported by "chaining" required network functions end-to-end. This approach simply virtualizes individual traditional network elements on cloud technology. At a macro level, it does not change how a communication service network is deployed and managed, e.g., by deploying an individual network function with the expected capability and statically integrating various network functions to chain an end-to-end functional grid.

While this approach may have several advantages from an operational and deterministic perspective, it may also have the following disadvantages: 1) a long development and deployment turn-around time (e.g., each new network function must be fully tested and re-integrated with the rest of the network functions); 2) complex and time-consuming upgrades to support the network evolution in terms of capability growth and new service feature introduction (e.g., often one new feature will impact dozens of network functions, variability of capacity growth may require realignment of multiple network functions, etc.); 3) inefficient resource utilization (e.g., the network is built to care for the busy hour (or day) traffic, while non-peak hours (or days) may result in inefficient use of the dedicated network capacity of virtual network functions); and 4) a large set of inter-dependent network functions complicate the integration design to deal with failure or individual network function exceptions in orchestrating failover, route-diversity, etc.

Moreover, the cloud infrastructure is inherently less reliable than traditional special purpose-built, fully integrated network servers. The need to maintain fault resilience in such a network becomes difficult with a large set of inter-dependent network functions. Troubleshooting and fault management becomes difficult and drives up the operational cost.

SUMMARY

One general aspect includes a method for bundling network functions as a single microservice in a cloud environment. For example, bundled network functions may include network functions that are responsible for transactional communication session processing and do not maintain session state and static user data. In some examples, a service deployment manager may acquire subscriber location information associated with a subscriber or a subscriber profile associated with the subscriber. Moreover, the service deployment manager may utilize the subscriber location information or the subscriber profile to select a cloud location. For example, the selection of a cloud location may be based on load, geographical proximity, service profile, etc. In some examples, bundled microservices may be constructed for a small group of user accounts, may be constructed for a single user per microservice instance, or may be constructed for a dozen users per microservice instance.

In some examples, the service deployment manager instantiates a single microservice including bundled network functions. For example, the service deployment manager may, based on Quality of Service (QoS) or mission critical services, use Kubernetes to bundle network functions such as P-CSCF, I-CSCF, S-CSCF, E-CSCF, BGCF, SCC-AS, TAS (e.g., CTS), or HSS-FE. See Appendix for a listing of acronyms. In some examples, the functions are bundled for the specific subscriber and, in some examples, the functions are bundled for a small group of subscribers including the subscriber.

In some examples, the service deployment manager deletes the microservice when it is no longer needed. For example, the service deployment manager may delete the microservice when the microservice is not needed for the subscriber or based on QoS.

In some examples, a service availability manager may monitor health of the microservice. For example, the service availability manager may monitor the health of the microservice at both the "infrastructure" level and at the application level to decide when and where to remove and re-deploy such a microservice instance. The service availability manager may communicate the health of the microservice to the service deployment manager, and, in some examples, the service deployment manager may recycle the microservice based on the health of the microservice.

In some examples, a Microservices Store may manage compatibility and interoperability of the network functions implemented as a single bundled microservice. For example, the Microservices Store may monitor and manage the network functions for microservice construction, inventory and lifecycle management, etc. In some examples, the Microservices Store may customize the microservice (e.g., selecting different "flavors" of microservices in real-time or near-real-time) based on the subscriber service profile or QoS requirements. For example, service for an IOT device account may not need to handle voice calls and, thus, its subscriber service profile may be different from profiles for user mobile device accounts. Moreover, service for a First Responder account may have higher QoS requirements than normal consumer accounts.

In some examples, a configuration and integration manager may manage one or more integration interfaces of the microservice. For example, the integration interfaces may connect with an end-to-end network system. Moreover, the configuration and integration manager may maintain instructions on how to connect with and use one or more other network functions (e.g., virtual network functions or non-virtualized network functions that may still need to be deployed at scale, such as EPC PCRF, HLR, HSS, and state databases, other gateway functions that connect with 3G and PSTN networks, and network management functions).

In accordance with some examples, a computer readable storage medium has stored therein instructions that are computer executable to perform or cause performance of any of the methods described herein. In accordance with some examples, a device includes one or more processors, a memory, and one or more programs; the one or more programs are stored in the memory and configured to be executed by the one or more processors and the one or more programs include instructions for performing or causing performance of any of the methods described herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

FIG. 4B is an illustration of a virtual network function (vNF) design versus a design providing service level virtualization across network functions.

FIG. 8 is a flowchart illustrating an exemplary method of bundling network functions.

FIG. 9B is a representation of an exemplary hardware platform for a network.

Figure 1:
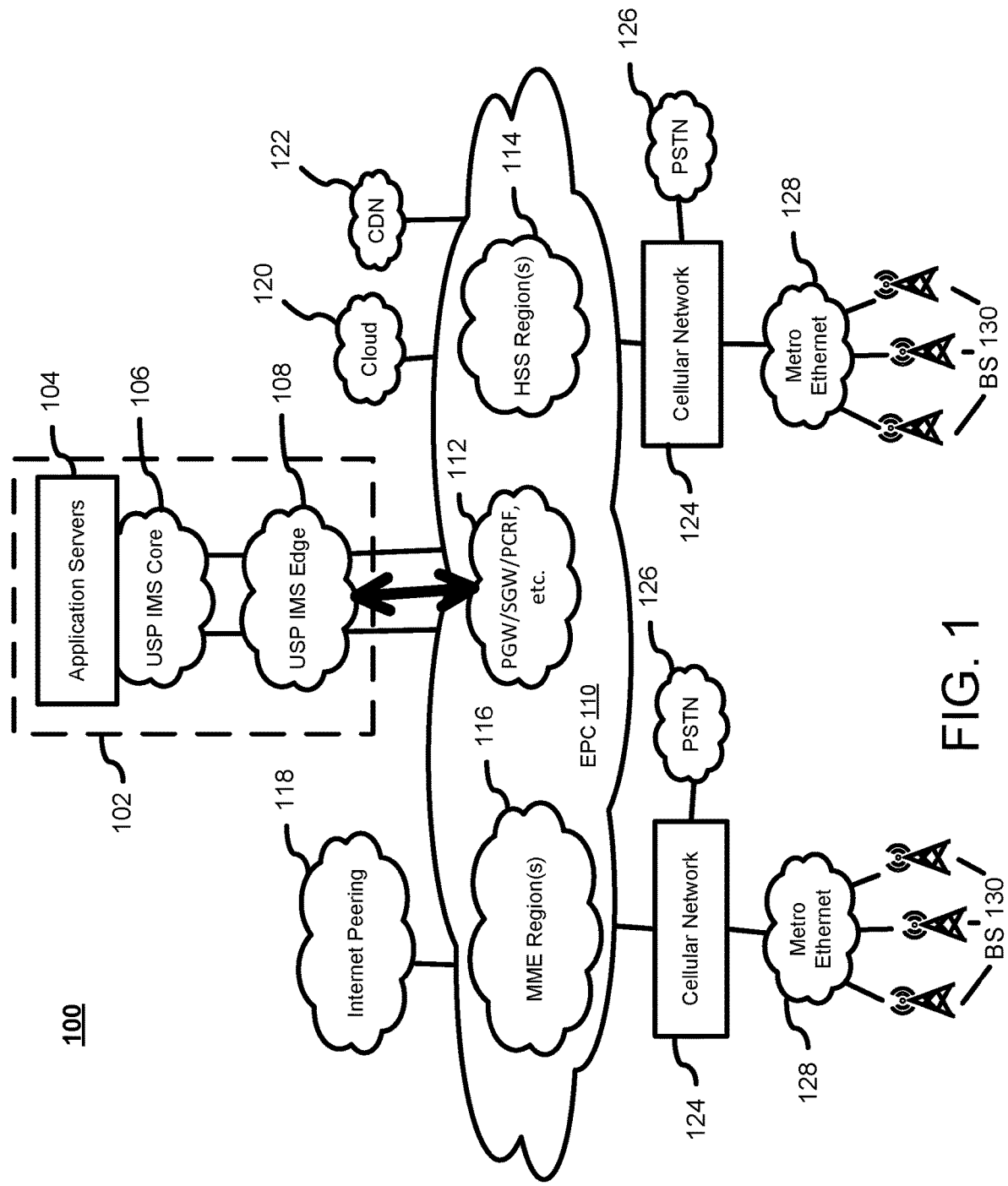
FIG. 1 is an illustration of a network platform that consists of multiple layers of network functions.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION OF ILLUSTRATIVE EMBODIMENTS

Glossary

API. An API is a set of functions and procedures allowing the creation of applications that access the features or data of an operating system, application, or other service.

Container. A container is a standard unit of software that packages code and all its dependencies so the application runs quickly and reliably from one computing environment to another.

Docker. Docker is a platform and tool for building, distributing, and running Docker containers.

Docker Containers. Docker containers are Containers that run on Docker Engine. Docker containers are standard and portable. They are lightweight because they share the machine's operating system kernel and therefore do not require an operating system for application. Docker containers are also secure.

Kubernetes. Kubernetes are container orchestration systems for Docker containers that are meant to coordinate clusters of nodes at scale in production in an efficient manner.

Microservices. A microservice is an architectural design that separates portions of a (usually monolithic) application into small, self-containing services. Microservice architecture creates relatively small services, develops and deploys them independently. Each microservice may use its own database and could be written in any programming language. In short, the microservice architectural style is an approach to developing a single application as a suite of small services, each running in its own process and communicating with lightweight mechanisms, often an HTTP resource API. These services are built around business capabilities, are independently deployable by fully automated deployment machinery, communicate through lightweight interfaces (e.g., REST JSON style requests and, in general, there is no need for an Enterprise Service Bus or complex XML SOAP envelopes), and have a decentralized control of data where each service manages its own data. Moreover, there is a bare minimum of centralized management of these services, which may be written in different programming languages and use different data storage technologies.

Service. A service is a self-contained unit of software that performs a specific task.

| Acronyms | |
|---|---|
| Abbreviation | Term |
| 2G | 2nd Generation |
| 3G | 3rd Generation |
| 4G | 4th Generation |
| 5G | 5th Generation |
| ACM | Advanced Services Module |
| ALFS | Automatic Location Function Server |
| AMG | Access Module Group |
| API | Application Programming Interface |
| AS | Application Server |
| BGCF | Breakout Gateway Control Function |
| CBB | Common BackBone |
| CD | Compact Disc |
| CDN | Content Delivery Network |
| CLI | Command-Line Interface |
| CLIMS | CVOIP Legacy IMS |
| CPM | Converged IP Messaging |
| CPU | Central Processing Unit |
| CSCF | Call Session Control Function |
| CTS | Client-To-Server |
| CVOIP | Consumer Voice over Internet Protocol |
| DNS | Domain Name System |
| DVD | Digital Versatile Disk |
| E-CSCF | Emergency CSCF |
| ECOMP | Enhanced Control, Orchestration, Management and Policy |
| EMS | Element Management System |
| ENUM | E.164 Number and DNS (RFC 2916) |
| EPC | Evolved Packet Core |
| EPS | Evolved Packet System |
| FE | Front End |
| FQDN | Fully Qualified Domain Name |
| GB | Giga-Byte |
| GMSC | Gateway Mobile Location Center |
| GPS | Global Positioning System |
| GPU | Graphics Processing Unit |

-continued

Acronyms

| Abbreviation | Term |
| --- | --- |
| HLR | Home Location Register |
| HSS | Home Subscriber Server |
| HTTPS | Secure Hypertext Transfer Protocol |
| HW | Hardware |
| I-CSCF | Interrogating CSCF |
| IEEE | Institute of Electrical & Electronics Engineers, Inc |
| IMS | IP Multimedia Subsystem |
| IOT | Internet of Things |
| IP | Internet Protocol |
| IPsec | IP Security |
| IPv4 | Internet Protocol version 4 |
| IPv6 | Internet Protocol version 6 |
| IT | Information Technology |
| LAN | Local Area Network |
| LCD | Liquid Crystal Display |
| LSC | Local Switching Center |
| LTE | Long Term Evolution |
| M2M | Mobile 2 Mobile |
| MCM | Management Control Module |
| MGCF | Media Gateway Control Function |
| MGW | Media Gateway |
| MIND | Master Integrated Network Delivery |
| MME | Mobility Management Entity |
| MTSO | Mobile Telephone Switching Office |
| NIC | Network Interface Card |
| OA&M | Operations, Administration, and Management |
| P-CSCF | Proxy CSCF |
| PC | Personal Computer |
| PCC | Policy and Charging Control |
| PCEF | Policy and Charging Enforcement Function |
| PCO | Protocol Configuration Options |
| PCRF | Policy and Charging Rules Function |
| PDN-GW | Packet Data Network Gateway |
| PDF | Policy Decision Function |
| PGW | Packet Data Network Gateway |
| PS | Packet Switched |
| PSTN | Public Switched Telephone Network |
| QCI | QoS Class Identifier |
| QoS | Quality of Service |
| RAM | Random Access Memory |
| RAN | Radio Access Network |
| RF | Radio Frequency |
| ROM | Read-Only Memory |
| S-CSCF | Serving CSCF |
| S-GW | Serving Gateway |
| SBC | Session Border Controller |
| SCC | Service Consistency and Continuity |
| SDN | Software Defined Network |
| SGSN | Serving GPRS Support Node |
| SIP | Session Initiation Protocol |
| SLF | Subscriber Location Functions |
| SMS | Short Message Service |
| SNMP | Simple Network Management Protocol |
| SOAP | Simple Object Access Protocol |
| SW | Software |
| TAS | Telephony Application Server |
| USB | Universal Serial Bus |
| USP | Universal Services Platform |
| UVP | Universal Voice Platform |
| VM | Virtual Machine |
| VNF | Virtual Network Function |
| VNFC | Virtual Network Function Component |
| VoIP | Voice over IP |
| VoLTE | Voice over Long Term Evolution |
| VPN | Virtual Private Network |
| vUSP | Virtualized USP |
| WiFi | Wireless Fidelity LAN specified by IEEE 802.11 |
| XML | Extensible Markup Language |

Network functions are not conventionally implemented as a single microservice. However, examples advance cloud technology into an era of Kubernetes and microservices, including implementing network functions, e.g., functions that are responsible for transactional communication session processing and do not maintain session state and static user data, as a single microservice. For example, P-CSCF, I-CSCF, S-CSCF, E-CSCF, BGCF, SCC-AS, TAS (e.g., CTS), or HSS-FE can be implemented as a single bundled microservice.

In some examples, when a communication service is requested by a subscriber, a bundled microservice instance may be instantiated in real-time. Such a microservice instance may be instantiated dynamically to serve a single user or a small group of users on-demand. Moreover, a single microservice may be instantiated when it is needed and deleted when it is not needed. Thus, according to examples, there is a need to pre-deploy virtual network functions individually and to statically pre-define the interdependent relationships among the set of network functions.

A new paradigm for virtualized network services may be implemented at a large scale and with high reliability (e.g., 5-9 s). Examples include several new management systems and methods, such as a service deployment manager, service availability manager, Microservices Store, and a configuration and integration manager.

As an example, a service deployment manager may acquire subscriber information (e.g., subscriber location information or subscriber profile) and select a cloud location based on the subscriber information or information associated with the cloud system (e.g., load, geographical proximity of the subscriber to the cloud, etc.). In examples, the service deployment manager may work with Kubernetes to instantiate a microservice specifically for a particular subscriber or for a small group of subscribers (e.g., including the particular subscriber). The service deployment manager may also decide when to delete the microservice, for example, when service for the subscriber (or group) is not needed.

In some examples, the deployment manager can decide based on "quality of service" how to deploy the required microservice for service continuity. For example, for mission-critical services such as a network supporting emergency services, a georedundant microservice instance for the same subscriber (or group) can be deployed in a more static manner or with enough redundancy to handle emergency traffic loads. Moreover, such an arrangement may utilize separate communication session state data and the HSS database to provide service continuity, including maintaining active call and other communication sessions.

In some examples, a service availability manager may monitor a health of the microservice and decide whether to deploy it again (e.g., recycle it). For example, the service availability manager may monitor the health at both the "infrastructure" level and at the application level to decide when and where to remove and re-deploy such a microservice instance.

In some examples, a Microservices Store may manage microservice construction, inventory, or lifecycle management. For example, the Microservices Store may manage the software release, compatibility and interoperability among the functions that are implemented as a single bundled microservice. Moreover, the Microservices Store may customize the construction of microservices or select different "flavors" of microservices in real-time or near-real-time based on the subscriber service profile and Quality of Service (QoS) requirements.

In some embodiments, a configuration and integration manager may manage the "integration interfaces" with the end-to-end network ecosystem. For example, the integration manager may maintain instructions on how to connect and use other network functions, such as those virtual network functions or non-virtualized legacy network functions that may still need to be deployed at scale. For example, EPC PCRF, HLR, HSS, and state databases, other gateway functions that connect with 3G and PSTN networks, and network management functions.

In some examples, advantages and benefits of the bundling network functions as a microservice include providing better resource utilization by creating a microservice instance for a (small group) of subscribers on-demand. Moreover, bundling network functions as a microservice may simplify network function integration, e.g., resulting in fewer network function types to integrate and to care for inter-dependency and interoperability. In some examples, bundling network functions as a single microservice may speed up development and deployment of a new version of network functions or emerging features. For example, a newer version of a microservice can be constructed and deployed to support a smaller customer group initially and then expanded to more customers gradually.

As illustrated in FIG. 1, an example may include a network platform 100 that consists of multiple layers of network functions. Moreover, subsystems (e.g., each cloud-shaped icon) may consist of several network functions.

An example may utilize universal services platform (USP) internet protocol multimedia subsystem (IMS) virtualization, e.g., a 4th Generation (4G) voice over Long Term Evolution (VoLTE) network. Moreover, a USP IMS edge and core 102 may include one or more application servers 104, such as a converged telephony server (CTS), a converged IP messaging server (CPM), etc. The USP IMS core network 106 may offer numerous services or functions, e.g., to user devices interconnected by the network platform 100. For example, a key function of the USP IMS core network 106 may be to direct telephone calls over the public-switched telephone network. The USP IMS edge network 108 may direct user service requests, e.g., a phone call or a message, to a particular location of the core network 106 and may belong to a particular access module group (AMG). For example, functions of the edge network 108 may include providing geographical redundancy support for services across many locations of the IMS core 106.

In an example, the evolved packet core (EPC) 110 (e.g., the IP Common Backbone or CBB) may support all enterprise and consumer services, including consumer broadband internet access, internet connectivity, VPN service, ethernet services, VOIP services, cloud services, mobility infrastructure and internet access, etc.

As illustrated, the EPC 110 may be deployed in various national data center (NDC) locations and may include a number of application functions 112 (e.g., PGW/SGW/PCRF, etc.), which may include gateways, e.g., to transport IP data between the user equipment and the external networks. For example, the application functions 112 may include a serving gateway (SGW) and a packet data network (PDN) gateway. Moreover, the SGW may be the point of interconnect between the radio-side and the EPC 110, e.g., serving the UE by routing the incoming and outgoing IP packets. The SGW may be logically connected to PDN GW (PGW). The PGW may be the point of interconnect between the EPC 110 and the external IP networks, e.g. Packet Data Networks (PDNs). Moreover, the PDN-GW may also perform various functions such as IP address/IP prefix allocation or PCC.

In an example, the application functions 112 may include functions for quality of service, charging, and policy control. For example, a policy and charging enforcement function (PCEF), may reside in the P-GW, e.g., supporting application detection, policy enforcement, and flow-based charging.

A policy and charging rules function (PCRF) may provide QoS authorization (QCI and bit rates) that decides how a certain data flow will be treated in PCEF and ensure consistency with the user's subscription profile. Moreover, domain name system (DNS) and master integrated network delivery (MIND) functions may also be included in the application functions 112.

As illustrated, the EPC 110 may include one or more home subscriber server (HSS) regions (e.g., HSS Region 114). Moreover, each HSS region may include a home location register (HLR). In examples, the EPC 110 may include one or more mobility management entity (MME) regions (e.g., MME Region 116). Moreover, each MME region may include one or more Serving GPRS Support Nodes (e.g., 2G SGSN, 3G SGSN, etc.).

In some examples, EPC 110 may be connected to one or more networks via internet peering functions (e.g., internet peering 118), one or more cloud functions (e.g., cloud 120), or one or more content delivery networks (e.g., CDN 122).

In some examples, EPC 110 may connect to one or more cellular networks (e.g., cellular network 124), each of which may include one or more mobile telephone switching office (MTSO) or local switching center (LSC) functions. Each cellular network 124 may be connected to a public switched telephone network (e.g., PSTN 126). Moreover, each cellular network 124 may be connected to an ethernet network (e.g., ethernet 128). Each ethernet network 128 may in turn be connected to one or more base stations (e.g., BS 130).

As shown in the example, voice calls may be handled by collaboration of, for example, all network functions shown in FIG. 1, including PGW, AMG networks or functions; voice signaling may be handled by PGW, AMG, and UVP Core networks or functions. SMS may be handled by PGW, AMG, UVP, and Application Servers; and data may be handled by PGW, Internet Peering, CDN, and Cloud networks or functions.

In some examples, USP IMS edge and core may be deployed in multiple service regions (e.g., five service regions). Moreover, network functions may be deployed in multiple regions and each region may include multiple core sites (e.g., major network functions of the IMS Edge and IMS Core as shown in the top-middle box of FIG. 1).

Figure 2:
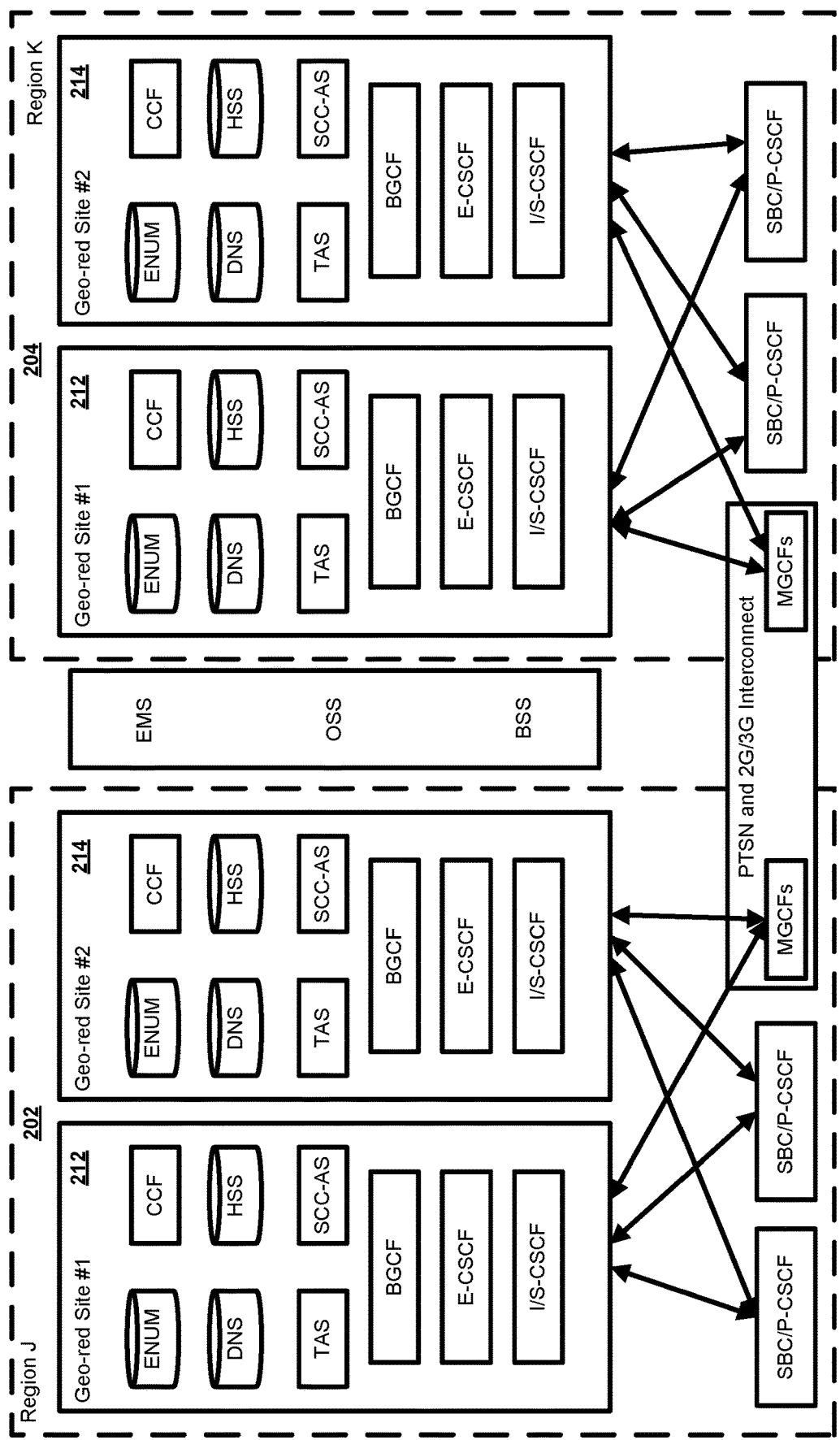
FIG. 2 is an illustration of deployment of major network functions.

As shown in FIG. 2, major network functions of the USP IMS edge and core 102 may be deployed in two USP service regions (e.g., Region J 202 and Region K 204), and each region with two core sites (e.g., Geo-red Site #1 212 and Geo-red Site #2 214). For example, USP IMS virtualization may focus on virtualization of each existing network function by utilizing cloud technology (e.g., Openstack, hypervisors, container, Kubernetes and microservices). Moreover, components of each network function (e.g., virtual network function components, or VNFC) may be implemented as microservices within a container and may be deployed quickly by Kubernetes. In some examples, virtualized USP IMS (vUSP) may be deployed as a whole solution. For example, a vUSP may be deployed at a predefined capacity (e.g., to support 100M subscriber) of every virtual network function, each network function consisting of several VNFC microservices, and may be spun up using Kubernetes. Thus, the vUSPs may be deployed in the network just like their physical counterparts. In some examples, when a subscriber registers for services, his device may be directed to attach and bound with an existing vUSP location.

Figure 3A:
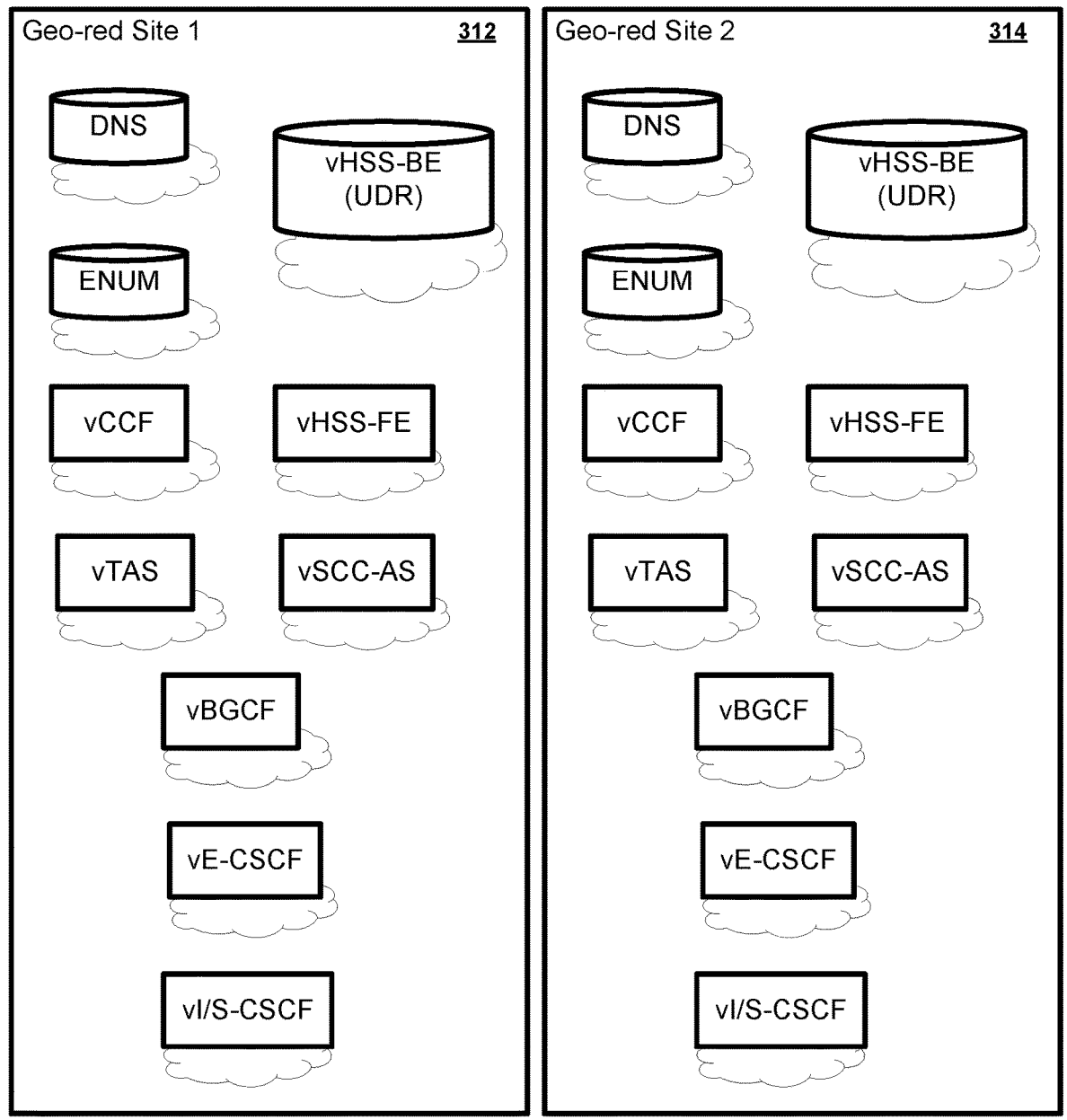
FIG. 3A is an illustration of virtual network functions.

FIG. 3A shows, according to some examples, an illustration of virtual network functions (e.g., virtualized USP IMS), e.g., vUSP IMS core sites 312 and 314.

Figure 3B:
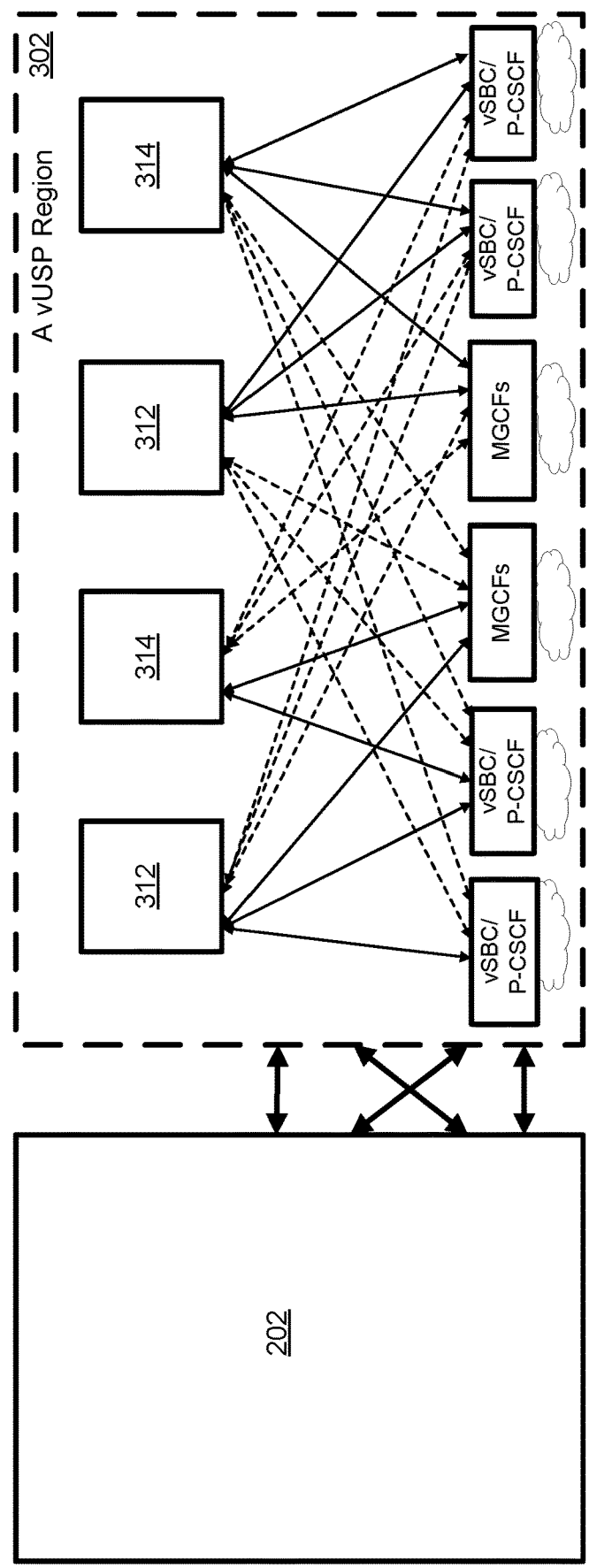
FIG. 3B is an illustration of a comparison of physical network functions versus virtual network functions.

FIG. 3B shows, according to some examples, a comparison of physical network functions (e.g., "Physical" USP IMS) versus virtual network functions (e.g., virtualized USP IMS). For example, the left-hand side of the diagram shows one USP region (e.g., Region J 202, one region out of a total of five regions) with two IMS core sites (e.g., 212 and 214) configured in 1+1 geographical redundant pair and the right-hand side of the diagram shows a vUSP region 302 with four IMS core sites (e.g., 312 and 314) configured in a 2+2 geographical redundant formation.

In some examples, microservices may be constructed that implement bundled IMS call processing functions (e.g., including I-CSCF, S-CSCF, E-CSCF, BGCF, SCC-AS, CTS, and HSS-FE) as a single network function. Moreover, bundled microservices may be instantiated for a subscriber at a time of subscriber registration and may be deleted at a time of subscriber deregistration. Thus, rather than "virtualization of individual network functions," examples may provide "service level virtualization across network functions."

Figure 4A:
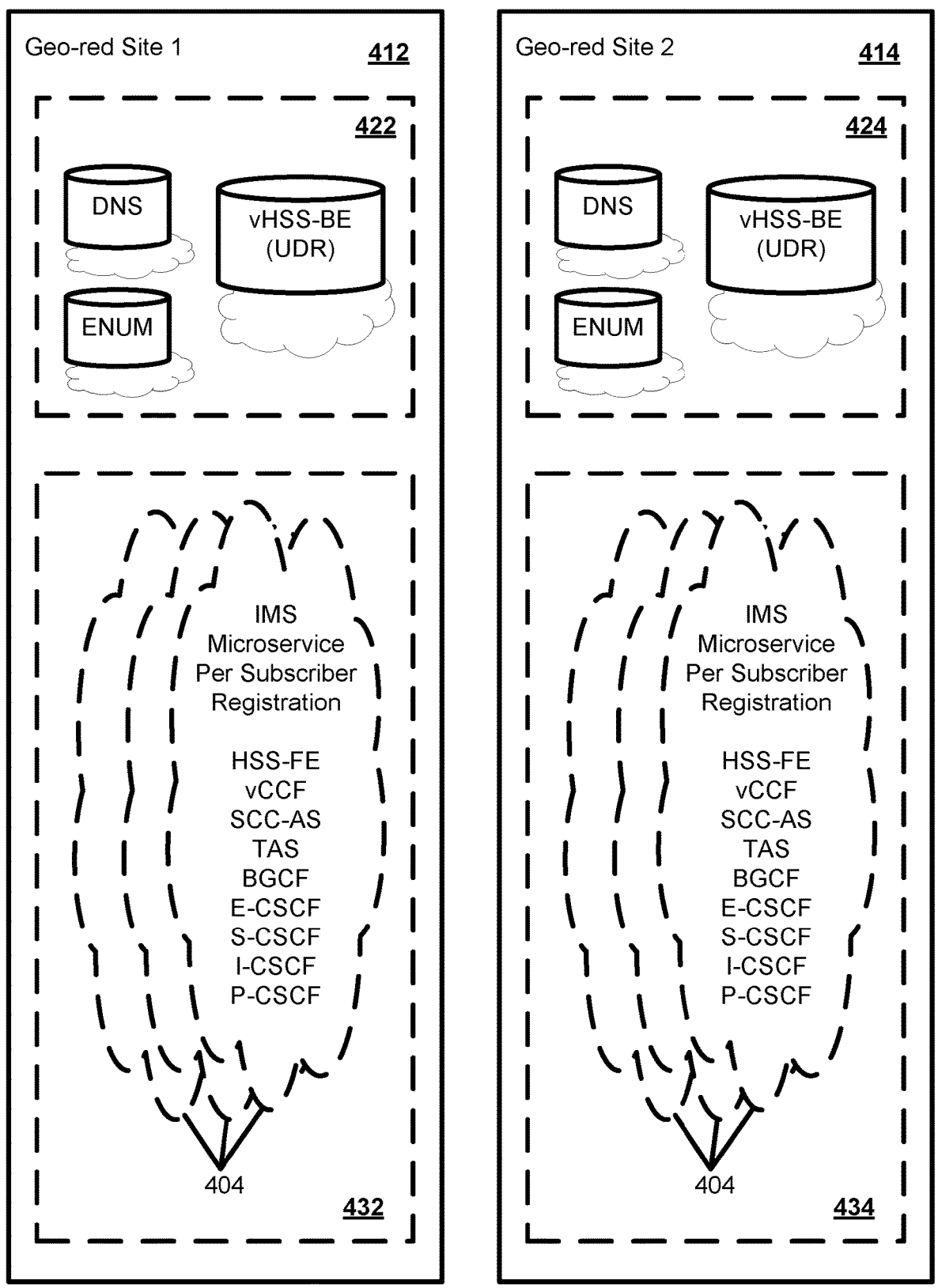
FIG. 4A is an illustration of a design providing service level virtualization across network functions.

FIG. 4A shows a design providing service level virtualization across network functions, e.g., sites 412 and 414 including database applications (e.g., 422 and 424) and bundled microservices (e.g., 432 and 434). In an example, 3GPP IMS functions 404 are implemented in a single microservice (e.g., 432 and 434). For example, 3GPP IMS functions 404 may include IMS Session Core Microservice, HSS-FE, BGCF, SCC-AS, E-CSCF, S-CSCF, I-CSCF, or P-CSCF. In some examples, a multitude of optimization features may be utilized to achieve optimal scalable and efficiency, e.g., community-based small grouping, caching microservices, or localization versus load distribution.

FIG. 4B shows, according to some examples, a VNF design (e.g., vUSP region 302) versus a design providing service level virtualization across network functions (vUSP region 402).

For example, via community-based small grouping, a bundled microservice (e.g., 432 and 434) may be defined for a small group of subscribers at a particular location, for a particular market, or for a particular interest group. In another example, via caching microservices, a microservice may be kept for a configurable time after all served subscribers are de-registered with expectation that the subscriber may re-register again in the near future.

Localization versus load distribution may also be utilized. For example, for a sunny day, it may be desired that microservices are instantiated in a cloud data center closer to the subscribers. However, when the network needs to quickly recover from a geographic disaster or a catastrophic fault event, many such microservices may need to be instantiated quickly. Thus, during such "fail-over" storm scenarios, it may be more ideal to instantiate requested microservices into multiple cloud data centers to distribute what would otherwise cause a spike of network load. Accordingly, additional support and management tools may be introduced to help run such a new network paradigm more efficiently.

Figure 5:
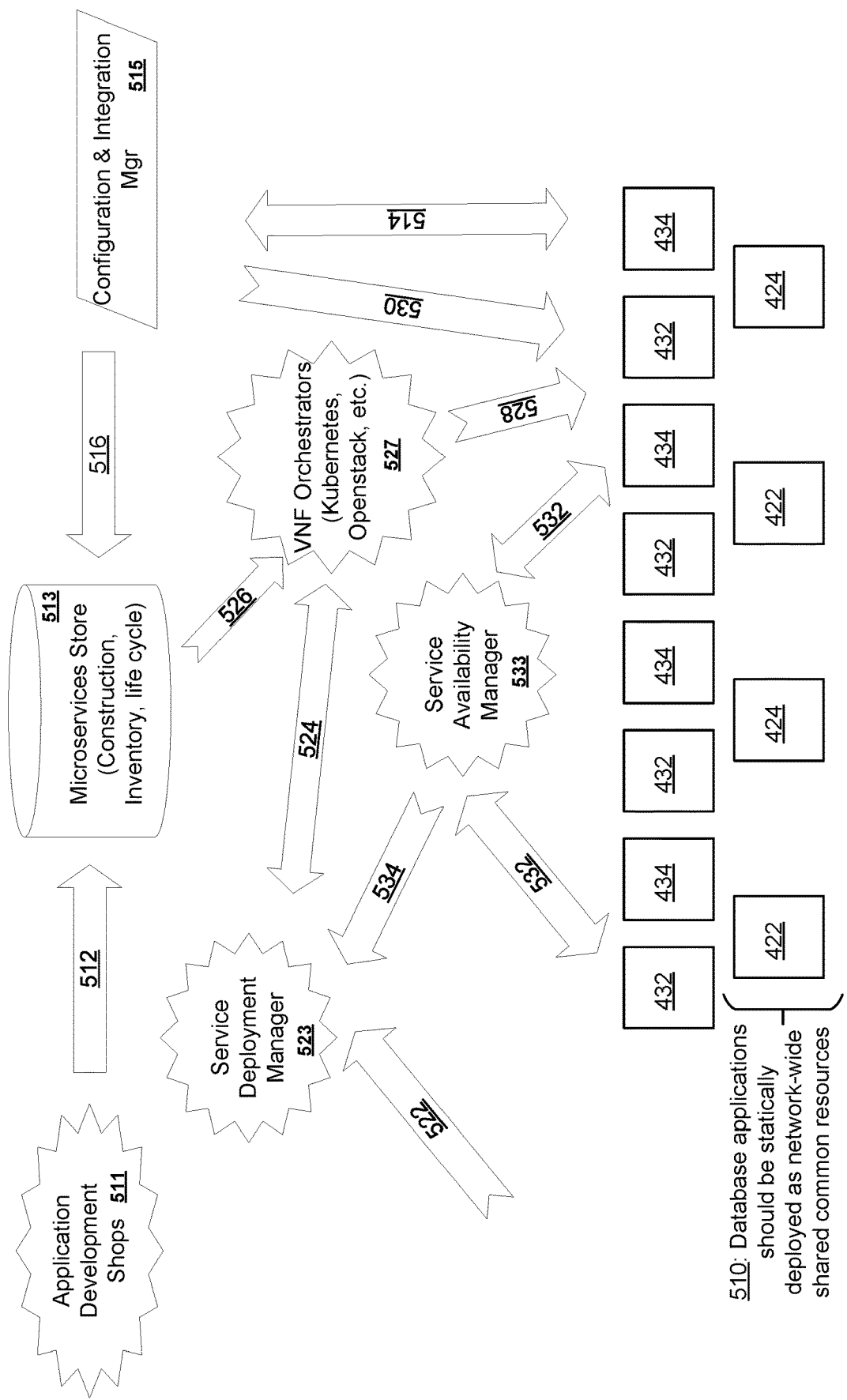
FIG. 5 is an illustration providing an overview of an exemplary system and example process flows.

FIG. 5 shows, according to an example, an overview of an exemplary system and example process flows. Moreover, as shown in FIG. 5, an example of deployed methods between new system components may be based on process flow sequence and dependency.

For example, the process flows illustrated in FIG. 5 may be the processes to ready an overall ecosystem for the service network to deploy proposed microservices in a dynamic, on-demand manner. The exemplary processes are shown as either one-way or two-way arrows between physical and virtual network components. It will be understood that such exemplary processes and the exemplary use cases set forth below are not intended to cover all such processes or use cases.

Exemplary process 510 may deploy virtualized network functions that serve various databases for more statically provisioned network and subscriber data. For example, multiple instances for these virtual network functions may be typically implemented and deployed across network, based on capacity needs and reliability requirements.

In exemplary process 512 (e.g., application microservice images create, patch, upgrade), application developers (e.g., Application Development Shops 511) may create application software for the microservice. For example, developers may be responsible for providing patches for bug fixes and upgrades for new features and enhancements. Moreover, certified software images may be submitted to Microservices Store 513 for deployment.

In exemplary process 514 (e.g., gather surround information), a Configuration and Integration Manager 515 may continuously collect and update network information (e.g., on other legacy systems) for other network elements, including network management systems (e.g., an Enhanced Control, Orchestration, Management and Policy or ECOMP platform), legacy network components (PSTN and 2G/3G media gateways, existing 4G EPC components such as S-GW, P-GW, HLR, MME, etc.), existing IMS-based network elements, etc. In some examples, the collected and up-to-date data may provide crucial interface information with which the new microservice instances may connect and interwork.

In exemplary process 516 (e.g., provide configuration information to new microservices), a Configuration and Integration Manager 515 may manage standard system configuration data for a microservice to ensure consistency and interoperability among microservice instances. Thus, software images in the Microservices Store 513 may have multiple releases and may evolve with new features. In some examples, most system parameters may be independent of specific instances or deployed sites and may be consistently set.

Moreover, any of the exemplary processes may continue to be repeated and each exemplary process may cycle on its own independently and in parallel, e.g., to keep up with the evolution of the communication service and network technology.

In exemplary process 522 (e.g., Request deployment of more microservices for new users), a Service Deployment Manager 523 may receive requests for deploying additional microservices. For example, the Service Deployment Manager 523 may be triggered after devices attach to the edge network (e.g., 4G LTE or 5G) and initiate new registrations to the IMS services. Moreover, the process may be fine-tuned and optimized further. For example, in a large-scale network with a concentration of subscribers in some metropolitan markets, a microservice may be sized for a group of users (1K, 10K, 50K, etc.) so that an operator does not need to manage what may be more than 100 million individual microservice instances on a per user basis. As another example, microservices may be tailored to a specific group or user community (e.g., emergency respondents, police on duty, special events, etc.) since the particular group or user community may establish a more coherent use pattern. As another example, microservices can be deployed with geographical redundancy for users with highest resilience and availability requirements (e.g., FirstNet first respondent users, etc.).

In exemplary process 524 (e.g., Trigger instantiation of new microservices), a Service Deployment Manager 523 may signal a VNF orchestrator 527 to instantiate request microservices on a specified location in the network. For example, while Kubernetes is one technology that can quickly spin up a microservice instance, a number of plugins may maintain openness for other orchestration technologies, including Openstack and vendor-proprietary orchestrators (VMware, Oracle, etc.)

In exemplary process 526 (e.g., Pull Image), a VNF Orchestrator 527 may identify a software image from the Microservices Store 513. In exemplary process 528 (e.g., Instantiate microservices), the VNF Orchestrator 527 may instantiate a microservice at a specified network location. In exemplary process 530 (e.g., microservice instance specific configuration), a new microservice instance may acquire instance and site-specific configuration information from the Configuration and Integration Manager 515.

In exemplary process 532 (e.g., Monitor to detect outage or fault), a Service Availability Manager 533 may continuously monitor the health of microservice applications and supporting network infrastructure (e.g., network connectivity, host server's availability, backend storage, etc.). For example, monitoring may utilize one or more fault management mechanisms (such as SNMP alarms), cloud-based monitoring on virtual machines (Openstack) or containers (Kubernetes), and other methods (such as monitoring for spike of particular call process error messages), etc. In exemplary process 534 (e.g., Request deployment of more microservices for failover), the Service Availability Manager 533 may notify the Service Deployment Manager 523 to deploy replacement microservices. In an example, Processes 524, 526 and 528 may follow to fulfill the request.

Although it may not be explicitly shown in the process flow diagram, the Service Availability Manager may monitor the utilization of existing microservice instances. For example, if some microservices instances are no longer used (i.e., all its users are offline), the Service Availability Manager may notify the Service Deployment Manager to delete the idle microservice instances and reclaim the network resources.

Figure 6:
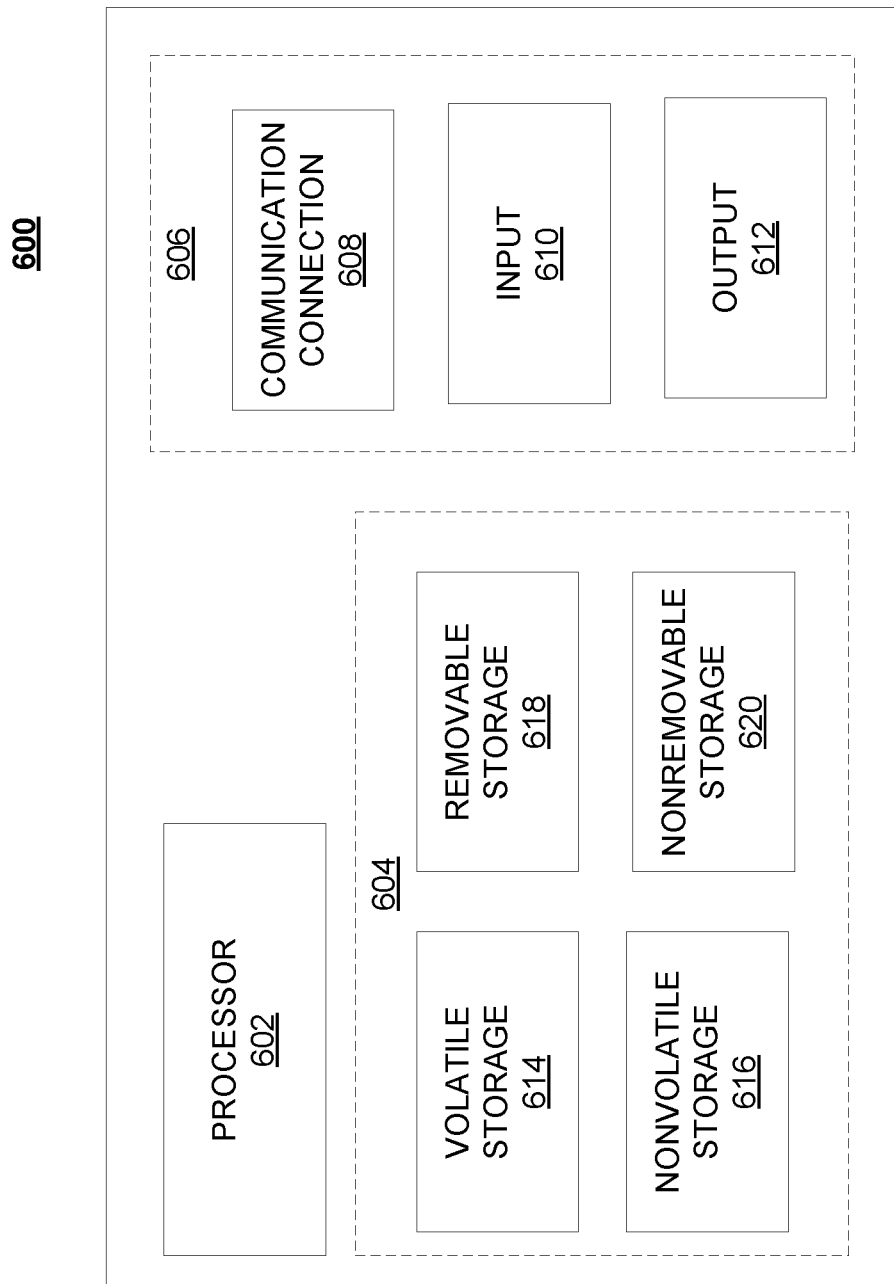
FIG. 6 illustrates a schematic of an exemplary network device.

FIG. 6 is a block diagram of network device 600 that may be connected to or comprise a component of communication system 100. Network device 600 may comprise hardware or a combination of hardware and software. The functionality to facilitate telecommunications via a telecommunications network may reside in one or a combination of network devices 600. Network device 600 depicted in FIG. 6 may represent or perform functionality of an appropriate network device 600, or a combination of network devices 600, such as, for example, a component or various components of a cellular broadcast system wireless network, a processor, a server, a gateway, an LTE or 5G anchor node or eNB, a mobile switching center (MSC), a short message service center (SMSC), an automatic location function server (ALFS), a gateway mobile location center (GMLC), a serving gateway (S-GW) 430, a packet data network (PDN) gateway, an RAN, a serving mobile location center (SMLC), or the like, or any appropriate combination thereof. It is emphasized that the block diagram depicted in FIG. 6 is exemplary and not intended to imply a limitation to a specific example or configuration. Thus, network device 600 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof Network device 600 may comprise a processor 602 and a memory 604 coupled to processor 602. Memory 604 may contain executable instructions that, when executed by processor 602, cause processor 602 to effectuate operations associated with mapping wireless signal strength. As evident from the description herein, network device 600 is not to be construed as software per se.

In addition to processor 602 and memory 604, network device 600 may include an input/output system 606. Processor 602, memory 604, and input/output system 606 may be coupled together (coupling not shown in FIG. 4) to allow communications between them. Each portion of network device 600 may comprise circuitry for performing functions associated with each respective portion. Thus, each portion may comprise hardware, or a combination of hardware and software. Accordingly, each portion of network device 600 is not to be construed as software per se. Input/output system 606 may be capable of receiving or providing information from or to a communications device or other network entities configured for telecommunications. For example, input/output system 606 may include a wireless communications (e.g., 3G/4G/5G/GPS) card. Input/output system 606 may be capable of receiving or sending video information, audio information, control information, image information, data, or any combination thereof. Input/output system 606 may be capable of transferring information with network device 600. In various configurations, input/output system 606 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 606 may comprise a Wi-Fi finder, a two-way GPS chipset or equivalent, or the like, or a combination thereof Input/output system 606 of network device 600 also may contain a communication connection 608 that allows network device 600 to communicate with other devices, network entities, or the like. Communication connection 608 may include wired media such as a wired network or direct-wired connection, or wireless media such as acoustic, RF, infrared, or other wireless media. Input/output system 606 also may include an input device 610 such as keyboard, mouse, pen, voice input device, or touch input device. Input/output system 606 may also include an output device 612, such as a display, speakers, or a printer.

Processor 602 may be capable of performing functions associated with telecommunications, such as functions for processing broadcast messages, as described herein. For example, processor 602 may be capable of, in conjunction with any other portion of network device 600, determining a type of broadcast message and acting according to the broadcast message type or content, as described herein.

Memory 604 of network device 600 may comprise a storage medium having a concrete, tangible, physical structure. As is known, a signal does not have a concrete, tangible, physical structure. Memory 604, as well as any computer-readable storage medium described herein, is not to be construed as a signal. Memory 604, as well as any computer-readable storage medium described herein, is not to be construed as a transient signal. Memory 604, as well as any computer-readable storage medium described herein, is not to be construed as a propagating signal. Memory 604, as well as any computer-readable storage medium described herein, is to be construed as an article of manufacture.

Memory 604 may store any information utilized in conjunction with telecommunications. Depending upon the exact configuration or type of processor, memory 604 may include a volatile storage 614 (such as some types of RAM), a nonvolatile storage 616 (such as ROM, flash memory), or a combination thereof. Memory 604 may include additional storage (e.g., a removable storage 618 or a non-removable storage 620) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 600. Memory 604 may comprise executable instructions that, when executed by processor 602, cause processor 602 to effectuate operations to map signal strengths in an area of interest.

Figure 7:
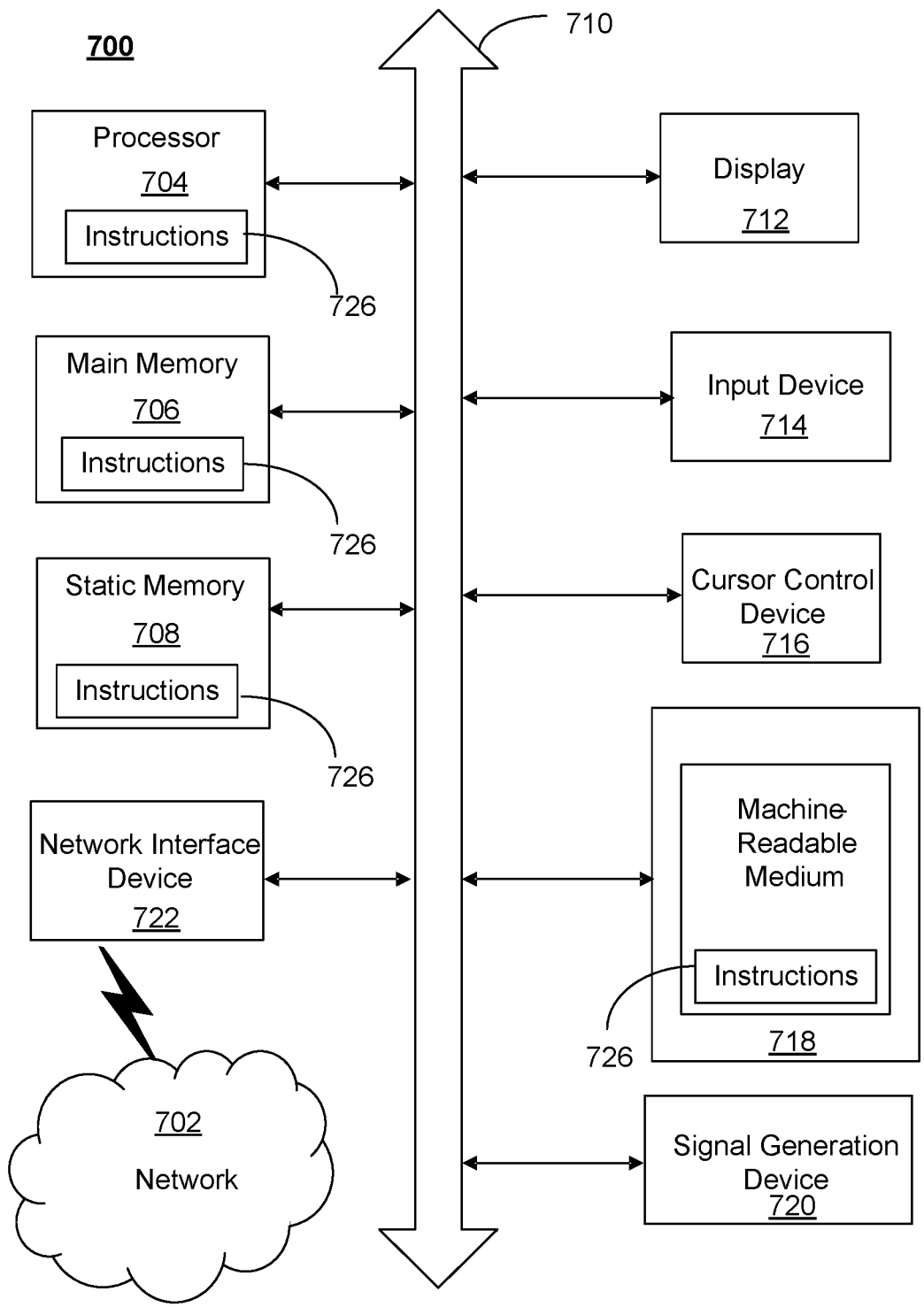
FIG. 7 illustrates an exemplary communication system that provides wireless telecommunication services over wireless communication networks.

FIG. 7 depicts an exemplary diagrammatic representation of a machine in the form of a computer system 700 within which a set of instructions, when executed, may cause the machine to perform any one or more of the methods described above. One or more instances of the machine can operate, for example, as processor 602 and other devices of FIG. 1, FIG. 2, FIG. 3, FIG. 4, FIG. 5, and FIG. 6. In some examples, the machine may be connected (e.g., using a network 702) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 700 may include a processor (or controller) 704 (e.g., a central processing unit (CPU)), a graphics processing unit (GPU, or both), a main memory 706 and a static memory 708, which communicate with each other via a bus 710. The computer system 700 may further include a display unit 712 (e.g., a liquid crystal display (LCD), a flat panel, or a solid-state display). Computer system 700 may include an input device 714 (e.g., a keyboard), a cursor control device 716 (e.g., a mouse), a disk drive unit 718, a signal generation device 720 (e.g., a speaker or remote control) and a network interface device 722. In distributed environments, the examples described in the subject disclosure can be adapted to utilize multiple display units 712 controlled by two or more computer systems 700. In this configuration, presentations described by the subject disclosure may in part be shown in a first of display units 712, while the remaining portion is presented in a second of display units 712.

The disk drive unit 718 may include a tangible computer-readable storage medium on which is stored one or more sets of instructions (e.g., instructions 726) embodying any one or more of the methods or functions described herein, including those methods illustrated above. Instructions 726 may also reside, completely or at least partially, within main memory 706, static memory 708, or within processor 704 during execution thereof by the computer system 700. Main memory 706 and processor 704 also may constitute tangible computer-readable storage media.

FIG. 8 is a flowchart illustrating an exemplary method 800 of bundling network functions. In some examples, the method 800 is performed by a device or machine (e.g., device 600 or computer system 700). For example, network functions implemented as a single bundled microservice may include network functions that are responsible for transactional communication session processing and do not maintain session state and static user data. Moreover, the method 800 may be performed at a network device, UE, desktop, laptop, mobile device, server device, or by multiple devices in communication with one another. In some embodiments, the method 800 is performed by processing logic, including hardware, firmware, software, or a combination thereof. In some embodiments, the method 800 is performed by a processor executing code stored in a computer-readable medium (e.g., a memory).

At block 802, the method 800 acquires subscriber location information associated with a subscriber.

At block 804, the method 800 acquires subscriber location information associated with a subscriber.

At block 806, the method 800 may select a cloud location based on the subscriber location information and the subscriber profile. For example, the cloud location may be further based on load geographical proximity, and service profile.

At block 808, the method 800 may instantiate a single microservice including the bundled network functions for the subscriber (e.g., a small group of subscribers including the subscriber). Network functions implemented as a single bundled microservice may include functions such as P-CSCF, I-CSCF, S-CSCF, E-CSCF, BGCF, SCC-AS, TAS, or HSS-FE. For example, the single microservice may be instantiated with Kubernetes. Moreover, the single microservice may be based on QoS or mission critical services.

At block 810, the method 800 may delete the single microservice. For example, the microservice may be deleted with the microservice is not needed for the subscriber or based on QoS requirements.

Embodiments of the methods disclosed herein may be performed in the operation of such computing devices. The order of the blocks presented in the examples above can be varied. For example, blocks can be re-ordered, combined, or broken into sub-blocks. Certain blocks or processes can be performed in parallel.

Figure 9A:
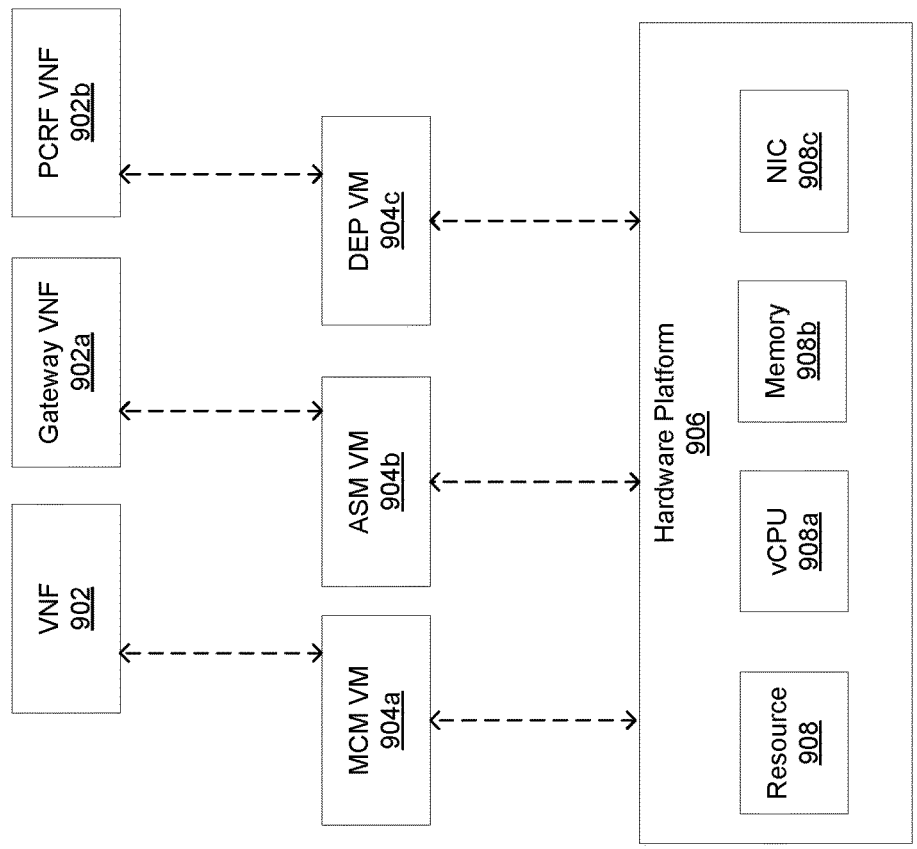
FIG. 9A is a representation of an exemplary network.

FIG. 9A is a representation of an exemplary network 900. Network 900 may comprise an SDN—that is, network 900 may include one or more virtualized functions implemented on general purpose hardware, such as in lieu of having dedicated hardware for every network function. That is, general purpose hardware of network 900 may be configured to run virtual network elements to support communication services, such as mobility services, including consumer services and enterprise services. These services may be provided or measured in sessions.

A virtual network functions (VNFs) 902 may be able to support a limited number of sessions. Each VNF 902 may have a VNF type that indicates its functionality or role. For example, FIG. 9A illustrates a gateway VNF 902a and a policy and charging rules function (PCRF) VNF 902b. Additionally or alternatively, VNFs 902 may include other types of VNFs. Each VNF 902 may use one or more virtual machines (VMs) 904 to operate. Each VM 904 may have a VM type that indicates its functionality or role. For example, FIG. 9A illustrates a management control module (MCM) VM 904*a*, an advanced services module (ASM) VM 904*b*, and a device enrollment program module (DEP) VM 904*c*. Additionally or alternatively, VMs 904 may include other types of VMs. Each VM 904 may consume various network resources from a hardware platform 906, such as a resource 908, a virtual central processing unit (vCPU) 908*a*, memory 908*b*, or a network interface card (NIC) 908*c*. Additionally or alternatively, hardware platform 906 may include other types of resources 908.

While FIG. 9A illustrates resources 908 as collectively contained in hardware platform 906, the configuration of hardware platform 906 may isolate, for example, certain memory 908*c* from other memory 908*c*. FIG. 9B provides an exemplary implementation of hardware platform 906.

Hardware platform 906 may comprise one or more chasses 910. Chassis 910 may refer to the physical housing or platform for multiple servers or other network equipment. In an aspect, chassis 910 may also refer to the underlying network equipment. Chassis 910 may include one or more servers 912. Server 912 may comprise general purpose computer hardware or a computer. In an aspect, chassis 910 may comprise a metal rack, and servers 912 of chassis 910 may comprise blade servers that are physically mounted in or on chassis 910.

Each server 912 may include one or more network resources 908, as illustrated. Servers 912 may be communicatively coupled together (not shown) in any combination or arrangement. For example, all servers 912 within a given chassis 910 may be communicatively coupled. As another example, servers 912 in different chasses 910 may be communicatively coupled. Additionally or alternatively, chasses 910 may be communicatively coupled together (not shown) in any combination or arrangement.

The characteristics of each chassis 910 and each server 912 may differ. For example, FIG. 9B illustrates that the number of servers 912 within two chasses 910 may vary. Additionally or alternatively, the type or number of resources 910 within each server 912 may vary. In an aspect, chassis 910 may be used to group servers 912 with the same resource characteristics. In another aspect, servers 912 within the same chassis 910 may have different resource characteristics.

Given hardware platform 906, the number of sessions that may be instantiated may vary depending upon how efficiently resources 908 are assigned to different VMs 904. For example, assignment of VMs 904 to particular resources 908 may be constrained by one or more rules. For example, a first rule may require that resources 908 assigned to a particular VM 904 be on the same server 912 or set of servers 912. For example, if VM 904 uses eight vCPUs 908*a*, 1 GB of memory 908*b*, and 2 NICs 908*c*, the rules may require that all of these resources 908 be sourced from the same server 912. Additionally or alternatively, VM 904 may require splitting resources 908 among multiple servers 912, but such splitting may need to conform with certain restrictions. For example, resources 908 for VM 904 may be able to be split between two servers 912. Default rules may apply. For example, a default rule may require that all resources 908 for a given VM 904 must come from the same server 912.

An affinity rule may restrict assignment of resources 908 for a particular VM 904 (or a particular type of VM 904). For example, an affinity rule may require that certain VMs 904 be instantiated on (that is, consume resources from) the same server 912 or chassis 910. For example, if VNF 902 uses six MCM VMs 904*a*, an affinity rule may dictate that those six MCM VMs 904*a* be instantiated on the same server 912 (or chassis 910). As another example, if VNF 902 uses MCM VMs 904*a*, ASM VMs 904*b*, and a third type of VMs 904, an affinity rule may dictate that at least the MCM VMs 904*a* and the ASM VMs 904*b* be instantiated on the same server 912 (or chassis 910). Affinity rules may restrict assignment of resources 908 based on the identity or type of resource 908, VNF 902, VM 904, chassis 910, server 912, or any combination thereof.

An anti-affinity rule may restrict assignment of resources 908 for a particular VM 904 (or a particular type of VM 904). In contrast to an affinity rule—which may require that certain VMs 904 be instantiated on the same server 912 or chassis 910—an anti-affinity rule requires that certain VMs 904 be instantiated on different servers 912 (or different chasses 910). For example, an anti-affinity rule may require that MCM VM 904*a* be instantiated on a particular server 912 that does not contain any ASM VMs 904*b*. As another example, an anti-affinity rule may require that MCM VMs 904*a* for a first VNF 902 be instantiated on a different server 912 (or chassis 910) than MCM VMs 904*a* for a second VNF 902. Anti-affinity rules may restrict assignment of resources 908 based on the identity or type of resource 908, VNF 902, VM 904, chassis 910, server 912, or any combination thereof.

Within these constraints, resources 908 of hardware platform 906 may be assigned to be used to instantiate VMs 904, which in turn may be used to instantiate VNFs 902, which in turn may be used to establish sessions. The different combinations for how such resources 908 may be assigned may vary in complexity and efficiency. For example, different assignments may have different limits of the number of sessions that can be established given a particular hardware platform 906.

While examples of a system for bundling network functions as a single microservice in a cloud environment have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes a device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure—bundling network functions—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to enable any person skilled in the art to practice the claimed subject matter, including making and using any devices or systems and performing any incorporated methods. The patentable scope is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

What is claimed:

1. A method for bundling network functions as a single microservice for a group of subscribers in a mobile communication system in a cloud environment, the method comprising:
    receiving a request to instantiate the single microservice for the group of subscribers;
    registering the group of subscribers for the single microservice, wherein the single microservice includes bundled network functions; wherein the registering is responsive to receiving the request;
    responsive to receiving the request, acquiring current subscriber location information associated with the group of subscribers in the mobile communication system, wherein at least some subscribers of the group of subscribers in the mobile communication system are mobile and have time-varying subscriber location information;
    acquiring subscriber profiles associated with subscribers of the group of subscribers;
    acquiring network load information for the cloud environment;
    based on the current subscriber location information, the subscriber profiles and the network load information, selecting a cloud location to balance geographical proximity between the current subscriber location information for the group of subscribers and the cloud location with distribution of a network load in the cloud environment to accommodate a fail-over scenario in the cloud environment;
    instantiating the single microservice including the bundled network functions for the group of subscribers at the cloud location, the bundled network functions including IP Multimedia Subsystem functions; and
    subsequently, de-registering the group of subscribers for the single microservice and deleting the single microservice when the single microservice is no longer needed by the group of subscribers.

2. The method of claim 1, further comprising:
    monitoring a health of the single microservice;
    communicating the health of the single microservice; and
    recycling the single microservice based on the health of the single microservice.

3. The method of claim 1, further comprising managing compatibility and interoperability of network functions bundled as the single microservice.

4. The method of claim 3, further comprising customizing the single microservice based on the subscriber profiles and Quality of Service (QoS) requirements.

5. The method of claim 1, further comprising managing one or more integration interfaces of the microservice, wherein the one or more integration interfaces connect with an end-to-end network system.

6. The method of claim 5, further comprising maintaining, by a configuration and integration manager, configuration data for connection with other network functions.

7. The method of claim 1, wherein the single microservice including the bundled network functions is instantiated with Kubernetes based on Quality of Service (QoS) requirements.

8. A system for bundling network functions as a single microservice for a group of subscribers of a mobile communication system in a cloud environment, the system comprising:
    a processor; and
    a memory including instructions that, when executed by the processor, cause the system to:
        receive a request to instantiate the single microservice for the group of subscribers in the mobile communication system;
        responsive to the request, register the group of subscribers for the single microservice, wherein the single microservice includes bundled network functions;
        responsive to the request, acquire current subscriber location information associated with the group of subscribers in the mobile communication system, wherein at least some subscribers of the group of subscribers in the mobile communication system are mobile and have time-varying subscriber location information;
        acquire subscriber profiles associated with the group of subscribers;

acquire network load information for the cloud environment;
based on the current subscriber location information, the subscriber profiles and the network load information, select a cloud location of the cloud environment to balance geographical proximity between the current subscriber location information for the group of subscribers and the cloud location with distribution of a network load in the cloud environment;
instantiate the single microservice including the bundled network functions for the group of subscribers at the cloud location, the bundled network functions including IP Multimedia Subsystem functions; and
delete the single microservice when the single microservice is no longer needed.

9. The system of claim 8, wherein the instructions are further configured to cause the system to:
monitor a health of the single microservice;
communicate the health of the single microservice; and
recycle the microservice based on the health of the microservice.

10. The system of claim 8, wherein the instructions are further configured to cause the system to manage compatibility and interoperability of the network functions bundled as the single microservice.

11. The system of claim 10, wherein the instructions are further configured to cause the system to customize the single microservice based on the subscriber profiles and Quality of Service (QoS) requirements.

12. The system of claim 8, wherein the instructions are further configured to cause the system to manage one or more integration interfaces of the microservice, wherein the one or more integration interfaces connect with an end-to-end network system.

13. The system of claim 12, further comprising a configuration and integration manager to maintain configuration data for connection with other network functions.

14. The system of claim 8, wherein the single microservice including the bundled network functions is instantiated with Kubernetes based on Quality of Service (QoS) requirements.

15. A non-transitory computer program product comprising:
a non-transitory computer-readable storage medium; and
instructions stored on the non-transitory computer-readable storage medium that, when executed by a processor, causes the processor to:
receive a request to instantiate a single microservice for a group of subscribers in a mobile communication system;
responsive to receiving the request, register the group of subscribers for the single microservice, wherein the single microservice includes bundled network functions;
responsive to receiving the request, acquire current subscriber location information associated with a the group of subscribers in a the mobile communication system, wherein at least some subscribers of the group of subscribers in the mobile communication system are mobile and have time-varying subscriber location information;
acquire subscriber profiles associated with the group of subscribers;
acquire network load information for a cloud environment;
based on the current subscriber location information, the subscriber profiles and the network load information, select a cloud location of the cloud environment to balance geographical proximity between the current subscriber location information for the group of subscribers and the cloud location with distribution of a network load in the cloud environment;
instantiate the single microservice including the bundled network functions for the group of subscribers at the cloud location, the bundled network functions including IP Multimedia Subsystem functions; and
delete the single microservice when the single microservice is no longer needed.

16. The non-transitory computer program product of claim 15, wherein the instructions are furtherconfigured to cause the processor to:
monitor a health of the single microservice;
communicate the health of the single microservice; and
recycle the single microservice based on the health of the single microservice.

17. The non-transitory computer program product of claim 15, wherein the instructions are further configured to cause the processor to manage compatibility and interoperability of the bundled network functions bundled as the single microservice.

18. The non-transitory computer program product of claim 17, wherein the instructions are further configured to cause the processor to customize the single microservice based on the subscriber profiles and Quality of Service (QoS) requirements.

19. The non-transitory computer program product of claim 15, wherein the instructions are further configured to cause the processor to manage one or more integration interfaces of the single microservice, wherein the one or more integration interfaces connect with an end-to-end network system.

20. The non-transitory computer program product of claim 19, wherein the instructions are further configured to cause a configuration and integration manager to maintain configuration data for connection with other network functions.

* * * * *

UNITED STATES PATENT AND TRADEMARK OFFICE
CERTIFICATE OF CORRECTION

PATENT NO. : 11,431,587 B2
APPLICATION NO. : 17/015463
DATED : August 30, 2022
INVENTOR(S) : Chaoxin Qiu et al.

It is certified that error appears in the above-identified patent and that said Letters Patent is hereby corrected as shown below:

In the Claims
-Column 20, Line 2, Claim 15 the word "a" should be removed before the word "the".
-Column 20, Line 3, Claim 15 the word "a" should be removed before the word "the".

Signed and Sealed this
Eighteenth Day of October, 2022

Katherine Kelly Vidal
*Director of the United States Patent and Trademark Office*